(12) United States Patent
Mathews et al.

(10) Patent No.: US 6,453,599 B2
(45) Date of Patent: Sep. 24, 2002

(54) FISHING LURE WITH SOUND ATTRACTION

(75) Inventors: Richard S. Mathews, Lee's Summit; Robert G. Link, Kansas City, both of MO (US)

(73) Assignee: Pop-A-Long L L C, Raytown, MO (US)

( * ) Notice: Subject to any disclaimer, the term of this patent is extended or adjusted under 35 U.S.C. 154(b) by 0 days.

(21) Appl. No.: 09/758,640

(22) Filed: Jan. 11, 2001

Related U.S. Application Data

(63) Continuation-in-part of application No. 09/320,146, filed on May 26, 1999, now Pat. No. 6,233,864.

(30) Foreign Application Priority Data

May 26, 2000 (CA) .............................................. 2309569

(51) Int. Cl.[7] .............................................. A01K 85/00
(52) U.S. Cl. .................... 43/42.31; 43/42.15; 43/42.02; 43/42.47
(58) Field of Search .............................. 43/42.31, 42.15, 43/42.02, 42.16, 42.22, 42.35, 42.39, 42.03, 42.09, 42.46, 42.47

(56) References Cited

U.S. PATENT DOCUMENTS

| | | | | |
|---|---|---|---|---|
| 2,835,068 A | * | 5/1958 | Latham | ...................... 43/42.16 |
| 3,226,875 A | * | 1/1966 | Woolums | .......................... 43/0 |
| 3,530,612 A | * | 9/1970 | Garrison | ..................... 43/42.16 |
| 4,761,910 A | * | 8/1988 | Ninomiya | ................... 43/42.31 |
| 4,873,782 A | * | 10/1989 | Gudermuth, Jr. | ........... 43/42.15 |
| 5,134,799 A | * | 8/1992 | Trnka | ......................... 43/42.22 |
| 5,201,784 A | * | 4/1993 | McWilliams | ................ 43/42.31 |
| 6,266,914 B1 | * | 7/2001 | Johnson et al. | ............. 43/42.13 |

FOREIGN PATENT DOCUMENTS

JP 10-28441 * 9/1998 .......... A01K/85/00

* cited by examiner

*Primary Examiner*—Peter M. Poon
*Assistant Examiner*—David Parsley
(74) *Attorney, Agent, or Firm*—Shighart Thomson & Kilroy P.C.

(57) ABSTRACT

A fishing lure is disclosed having a body with two sections that move relative to one another. An aft section is connected via a shaft to a fore section and is slidable toward and away from the aft section along the shaft as the lure is pulled through the water. A contact post mounted on a rear end of the fore section or a fore end of the rear section impacts the other section as the lure is pulled through the water producing a clicking or popping sound which attracts fish.

20 Claims, 13 Drawing Sheets

FISHING LURE WITH SOUND ATTRACTION

This application is a continuation-in-part of U.S. patent application Ser. No. 09/320,146 entitled Noise-Making Fishing Lure which was filed May 26, 1999 now U.S. Pat. No. 6,233,864, and claims benefit of an earlier filing date for a portion of the new matter under 35 U.S.C. §119 based upon Canadian Patent Application No. 2,309,569 entitled Cadence-Adjustable Popping Fishing Lure which was filed May 26, 2000.

BACKGROUND OF THE INVENTION

1. Field of the Invention

The present invention relates generally to fishing tackle, and in particular to a fishing lure with reciprocating body sections that engage one another to produce clicking or popping noises.

2. Description of the Related Art

Fish may be attracted by a fishing lure's features such as shape, color, or sounds produced by the lure. A lure which possesses desirable characteristics will attract fish. The particular characteristics which are attractive can vary depending upon the environment. For example, in clear water fish may become attracted from a distance by a brightly colored lure, or by a lure that moves similar to live prey. Conversely, in muddy water, fish may first become attracted to a noise-making type lure. Then, as fish approach the lure, they may also become attracted by other characteristics.

The prior art includes various noise-making lures of different sizes, shapes, colors and other features. For example, U.S. Pat. No. 3,530,612 to Garrison discloses a fishing lure having a noisemaker. The Garrison lure includes a tooth mounted to a main portion thereof and a disc mounted to a top portion thereof. When the lure is pulled through water, the tooth continuously engages the disc, producing noise. Others have designed different lures for similar purposes. However, such lures generally are more complicated in construction and, therefore, more expensive to manufacture and more difficult to use.

The present invention addresses the shortcomings of the previous fishing lures. Heretofore there has not been available a noise-making fishing lure with the advantages and features of the present invention.

SUMMARY OF THE INVENTION

The present invention generally comprises a fishing lure having a body that is divided into two sections that move relative to one another, and a longitudinal axis generally corresponding to a direction-of-travel of the fishing lure. An aft section is connected via a shaft to a fore section and is slidable toward and away from the fore section along the shaft such that the aft section intermittently contacts the fore section as the lure is pulled through the water.

More particularly, a post or striker is mounted on a proximate end of either the fore or aft section, and a contact surface is located on a proximate end of the other section. The lure is tied to a fishing line. As the lure is pulled through the water by tugging the fishing line, the striker intermittently contacts the contact surface producing a clicking or popping sound which attracts fish.

The visual appearance of the present invention is also attractive to fish. Namely, the sliding movement of the aft section with respect to the fore section as the lure is pulled through the water produces a "wounded prey" effect. Thus, the present invention is attractive to fish for several reasons, and has characteristics unlike any prior art lures.

OBJECTS AND ADVANTAGES OF THE INVENTION

The principle objects and advantages of the present invention include: providing a noise-making fishing lure which attracts and catches fish; providing such a lure with reciprocating body sections that intermittently produce a noise by contacting one another as the lure is pulled through the water; providing such a lure which simulates the appearance of a "wounded prey" when it moves atop water; providing such a lure which is self-ballasting; providing such a lure which is relatively simple to manufacture; and providing such a lure which is particularly well-adapted for the intended usages thereof Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof

DETAILED DESCRIPTION OF THE INVENTION

I. Introduction and Environment

Figure 1:
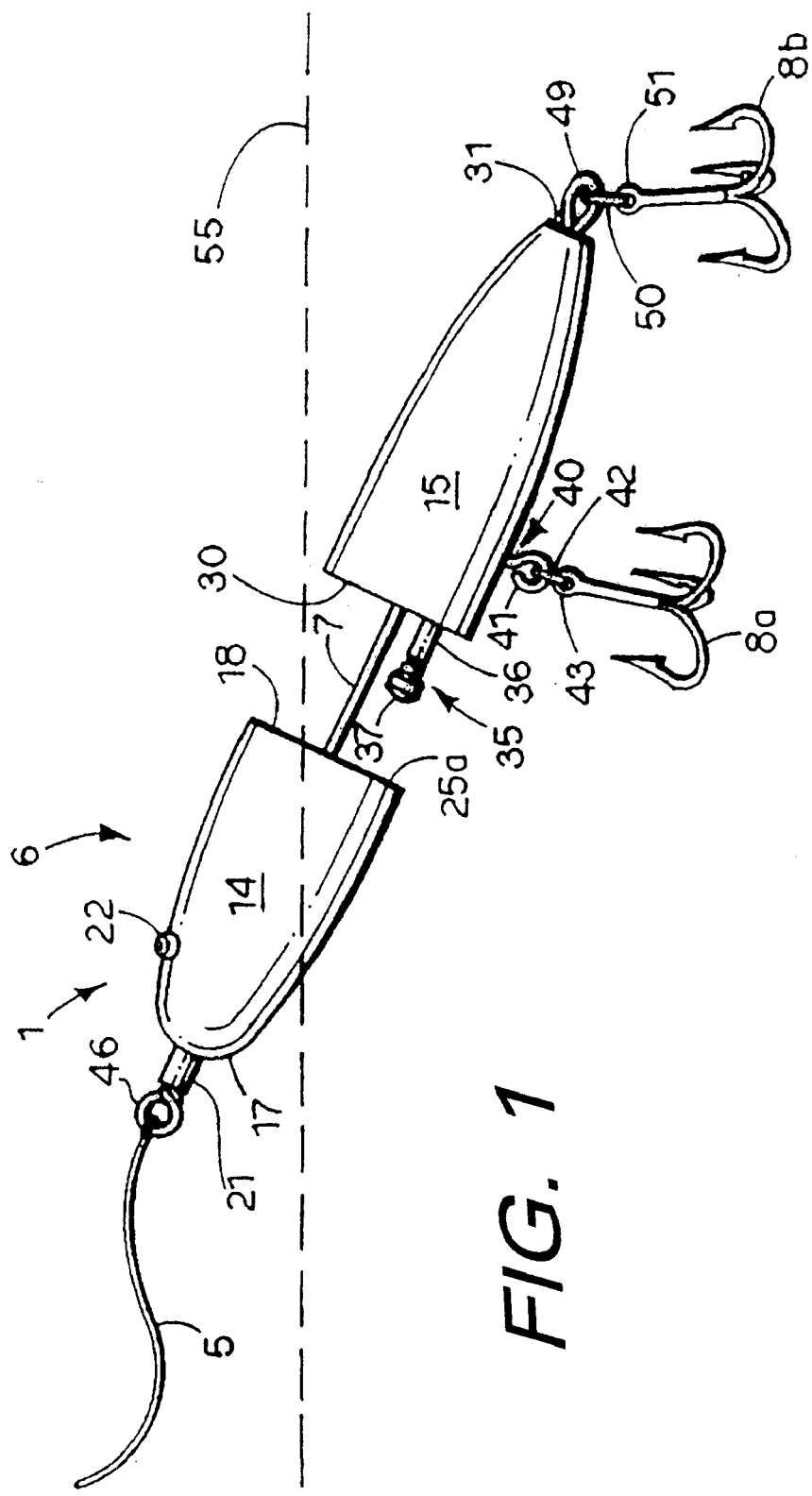
FIG. 1 is a side elevational view of a noise-making fishing lure embodying the present invention in an extended configuration.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly", and "leftwardly" will refer to directions in the drawings to which reference is made. The words "inwardly" and "outwardly" will refer to directions toward and away from, respectively, the geometric center of the embodiment being described and designated parts thereof Said terminology will include the words specifically mentioned, derivatives thereof and words of a similar import.

Referring to the drawings and FIG. 1 in greater detail, the reference numeral 1 generally refers to a noisemaking fishing lure embodying the present invention. The fishing lure 1 can be attached to a length of fishing line 5 and generally comprises a two-part body 6, a shaft 7, and a hooking device 8.

II. Fishing Lure Body 6, Shaft 7 and Hooking Device 8.

Figure 3:
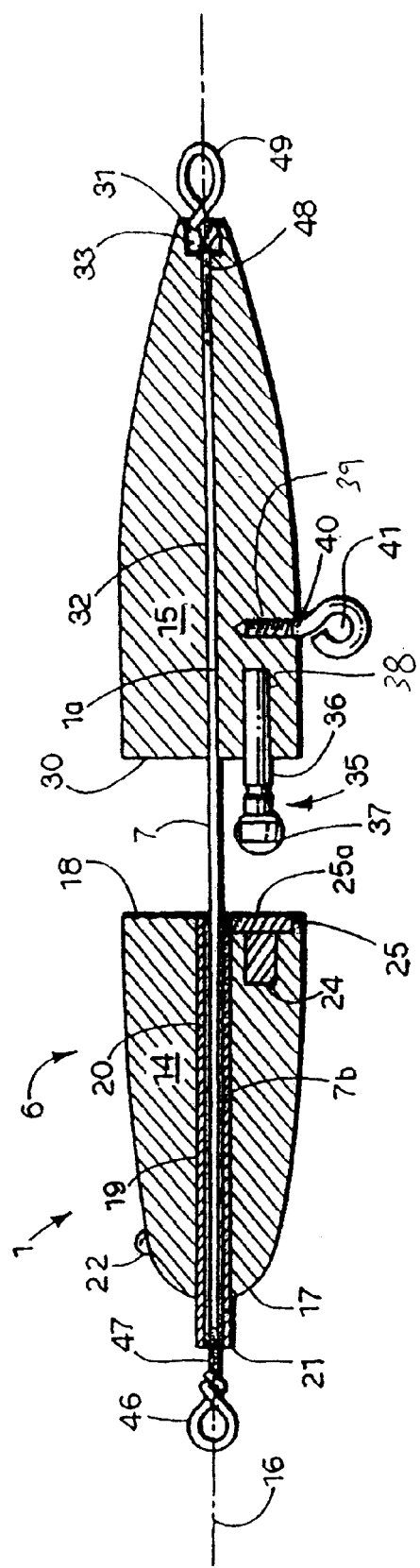
FIG. 3 is a sectional view of the fishing lure in its extended configuration.

The body 6 can be made of any suitable material including wood, plastic, ceramics, rubber, etc. The body 6 comprises a pair of body sections including a generally cylindrical fore section 14 and a generally cylindrical aft section 15. In operation, the fore section 14 and aft section 15 move relative one another about a longitudinal axis 16 (FIG. 3) generally corresponding to a direction-of-travel of the fishing lure 1.

The fore section 14 includes a rounded or dome-like distal end 17, and a flat proximate end 18. A bore 19 extends lengthwise through the geometric center of the fore section 14. A barrel 20 including a distal end or nose 21 lines the interior of the bore 19 and is attached therein by any suitable means (e.g. glueing with a water-proof adhesive, friction fitting). The barrel 20 can be constructed of any suitable material including plastic. The nose 21 extends beyond the distal end 17 of the fore section 14. A relatively small semi-spherical fish eye 22 is attached by any suitable means (e.g. glueing with a water-proof adhesive) to a top portion of the fore section 14 near the distal end 17. A cylindrical, metallic ballasting member 24 and a disc-like impact member 25 are countersunk and attached by any suitable means (e.g. glueing with a water-proof adhesive or friction fitting) to a lower portion of the fore section's proximate end 18 The impact member 25 includes an outer contact surface 25a, the purpose of which will be discussed later.

The fore section 14 includes a rounded or dome-like distal end 17, and a flat proximate end 18. A bore 19 extends lengthwise through the geometric center of the fore section 14. A barrel 20 including a distal end or nose 21 lines the interior of the bore 19 and is attached therein by any suitable means (e.g. glueing with a water-proof adhesive, friction fitting). The barrel 20 can be constructed of any suitable material including plastic. The nose 21 extends beyond the distal end 17 of the fore section 14. A relatively small semi-spherical fish eye 22 is attached by any suitable means (e.g. glueing with a water-proof adhesive) to a top portion of the fore section 14 near the distal end 17. A cylindrical, metallic ballasting member 24 and a disc-like impact member 25 are countersunk and attached by any suitable means (e.g. glueing with a water-proof adhesive or friction fitting) to a lower portion of the fore section's proximate end 18 The impact member 25 includes an outer contact surface 25a, the purpose of which will be discussed later.

The aft section 15 includes a flat proximate end 30, and a tapered distal end 31. A bore 32 extends lengthwise through the geometric center of the aft section 15. A notch 33 is formed in the aft section's distal end 31. A metallic striker 35 including a shaft 36 and a head 37 is attached by any suitable means to a lower portion of the aft section's proximate end 30. For example, the striker 35 can be attached by countersinking the shaft 36 into a first receiver 38 in the aft section's proximate end 30 and secured therein by a friction fit, or secured with a water-proof adhesive. The aft section 15 also includes a second receiver 39 located at a bottom portion thereof for receiving a threaded end of a screw 40. The screw 40 includes an eye 41 mounting a ring 42 attached to an eye 43 of a first hooking device 8a. The hooking device 8a is free to move in multiple directions about the eye 41.

The fore section 14 and the aft section 15 are both connected to the shaft 7. The shaft 7 is inserted into the aft section's bore 32 and secured thereto along a distal portion 7a of the shaft 7 by any suitable means (e.g. gluing with a waterproof adhesive, friction fitting). The shaft 7 is also inserted into the fore section's barrel 20. The fore section 14 can slide relative the shaft along a proximate portion 7b of the shaft 7.

The shaft 7 includes a first shaft eye 46 located at a proximate end 47 of the shaft 7. Fishing line 5 is attached to the lure 1 at the eye 46. The shaft 7 terminates at a distal end 48 where a second shaft eye 49 mounts a ring 50 attached to an eye 51 of a second hooking device 8b. The hooking device 8b is free to move in multiple directions about the eye 49.

III. Operation.

The fishing line 5 with the lure 1 attached thereto may be cast into or positioned in a body of water 55. In the present embodiment, the fishing lure 1 will float atop the water 55 due to the buoyancy of the body 6. It should be noted that if the aft section 15 is less buoyant than the fore section 14, the aft section 15 will tend to sink with respect to the fore section 14 when the lure 1 is placed into the body of water 55 (FIG. 1).

Figure 2:
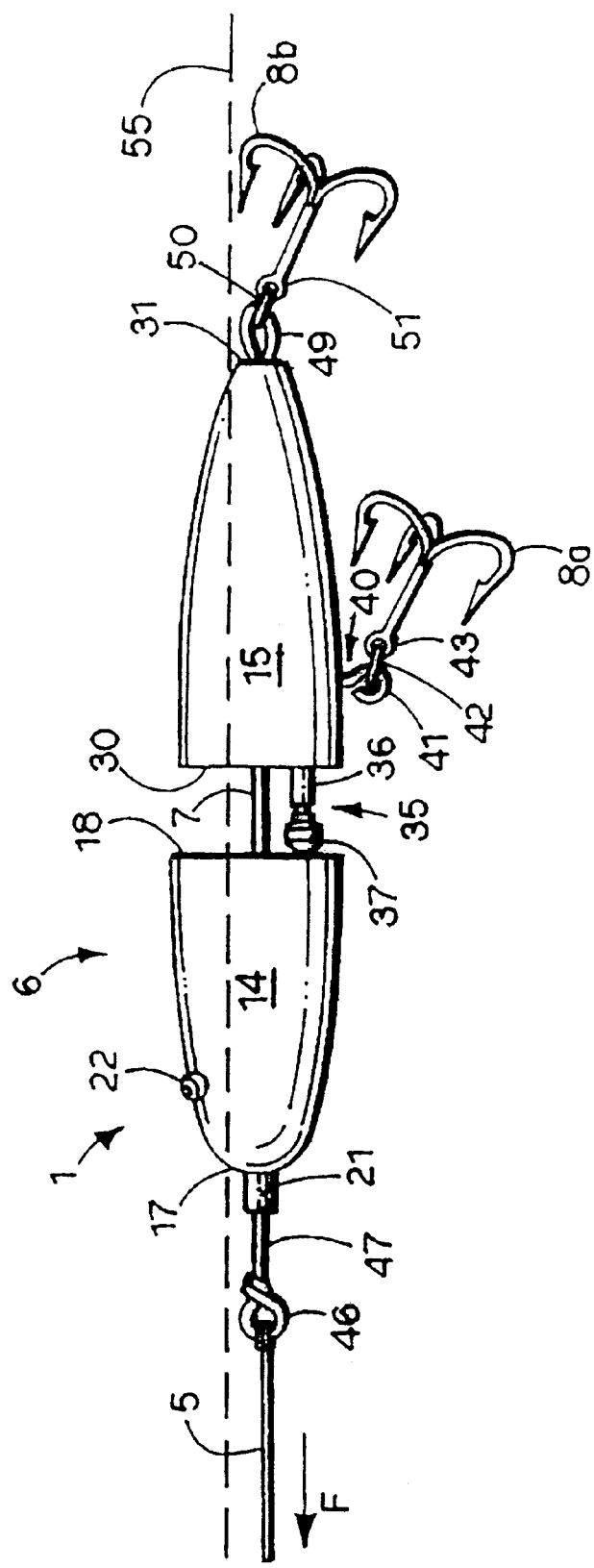
FIG. 2 is a side elevational view of the fishing lure in a contracted configuration.

When a force F (FIG. 2) is imparted to the fishing line 5, for example by an angler tugging at the line 5, the force F will pull the shaft 7 and the aft section 15 toward the fore section 14. Resistant forces created by water 55 surrounding the fore section 14 allow it to remain relatively static when the force F is applied to the fishing line 5. Thus, the aft section 15 moves into the fore section 14 and causes the striker head 37 to contact the impact surface 25a which results in a clicking or popping noise. This process can be repeated in an attempt to "bait" fish into striking the lure 1, and capturing said fish on the hooking devices 8a,8b.

IV. First Modified Embodiment: Fishing Lure 102.

A fishing lure 102 comprising a first modified embodiment of the present invention is shown in FIGS. 4–10. The fishing lure 102 generally comprises a body 103 with fore and aft sections 104, 106, a shaft 108 connecting same and a pair of treble hooks 110.

The fore section 104 includes front and back ends 105a,b and first and second halves 112a,b. Each half 112a,b is hollow whereby the fore section 104 has an interior 114. The halves 112a,b include respective channels 118a,b which form a fore section bore 120 when the halves 112a,b are joined together, e.g. by ultrasonic welding, adhesive or any other suitable means.

The aft section 106 includes front and back ends 107a,b and first and second halves 122a,b. Each half 122a,b is hollow whereby an aft section interior 124 is formed when the halves 122a,b are joined together. The aft section 106 includes a shaft boss 126 with a shaft boss pin 126a, a dorsal hook boss 128 with a dorsal hook boss pin 128a, and a back end hook boss 129 with a back end hook boss 129a. The aft section halves 122a,b include respective channels 123a,b which form an aft section bore 125 which aligns with the fore section bore 120 and respective interlocking rims 127a,b.

Figure 4:
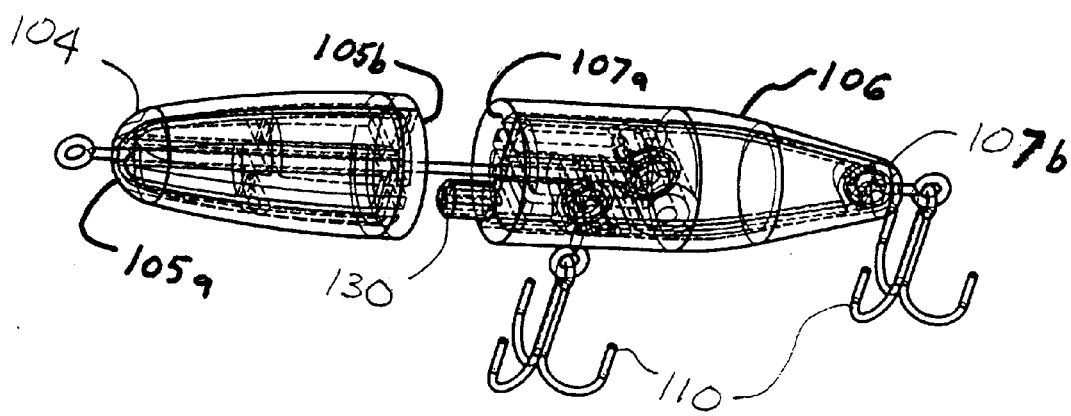
FIG. 4 is perspective view of a fishing lure comprising a first modified embodiment of the present invention.
Figure 5:
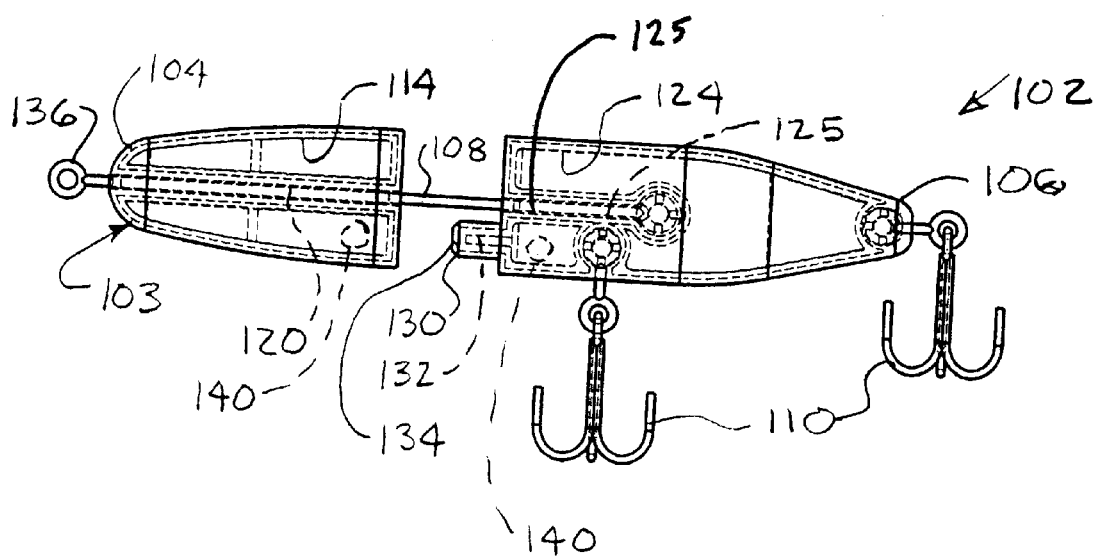
FIG. 5 is a side elevational view thereof
Figure 6A:
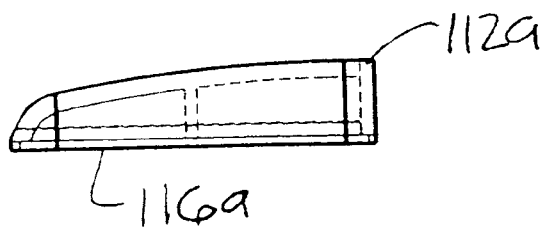
FIG. 6a is a top plan view of a right half of a fore section thereof
Figure 6B:
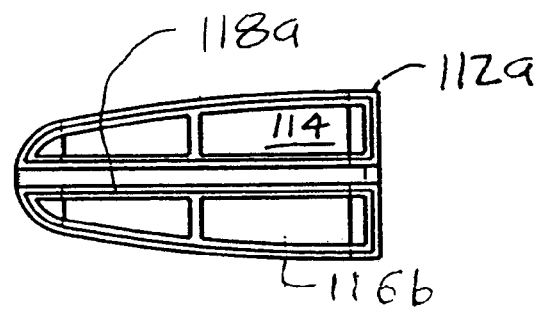
FIG. 6b is a side elevational view thereof
Figure 7A:
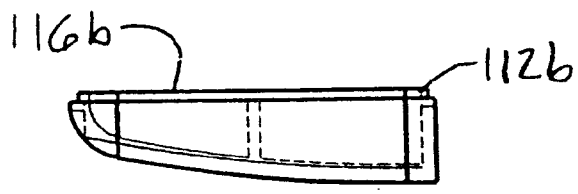
FIG. 7a is a top plan view of a left half of the fore section.
Figure 7B:
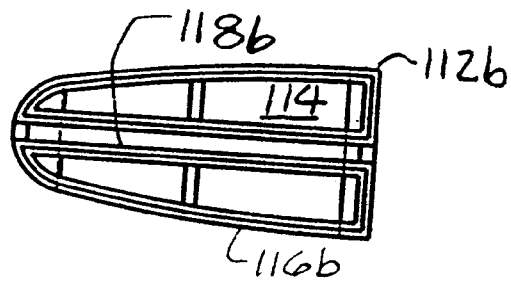
FIG. 7b is a side elevational view thereof
Figure 8A:
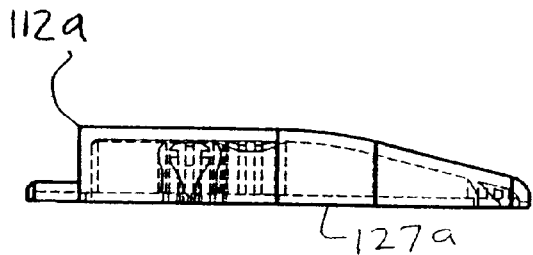
FIG. 8a is a top plan view of a left half of an aft section thereof
Figure 8B:
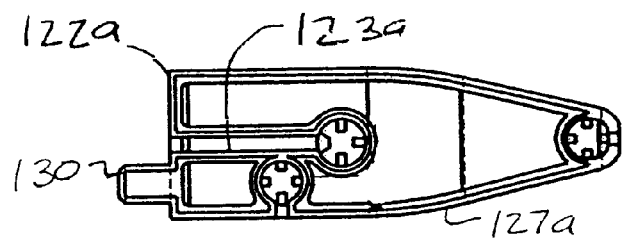
FIG. 8b is a side elevational view thereof
Figure 9A:
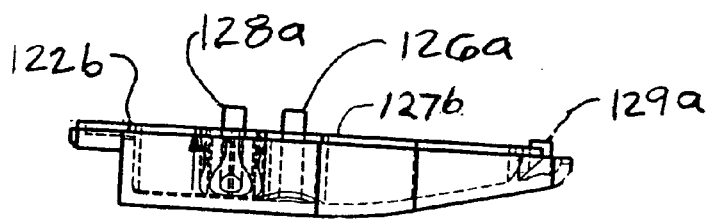
FIG. 9a is a top plan view of a right half of the aft section.
Figure 9B:
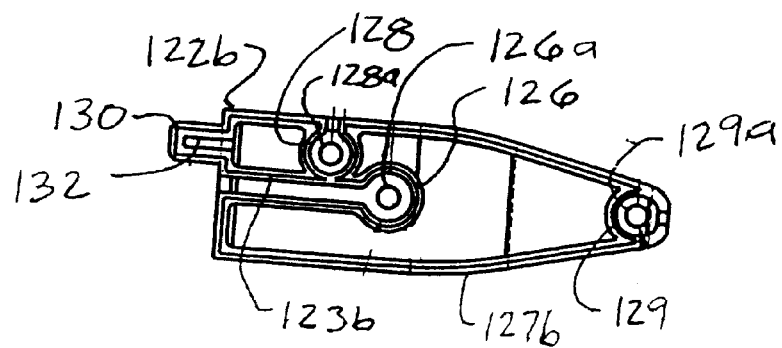
FIG. 9b is a side elevational view thereof
Figure 10:
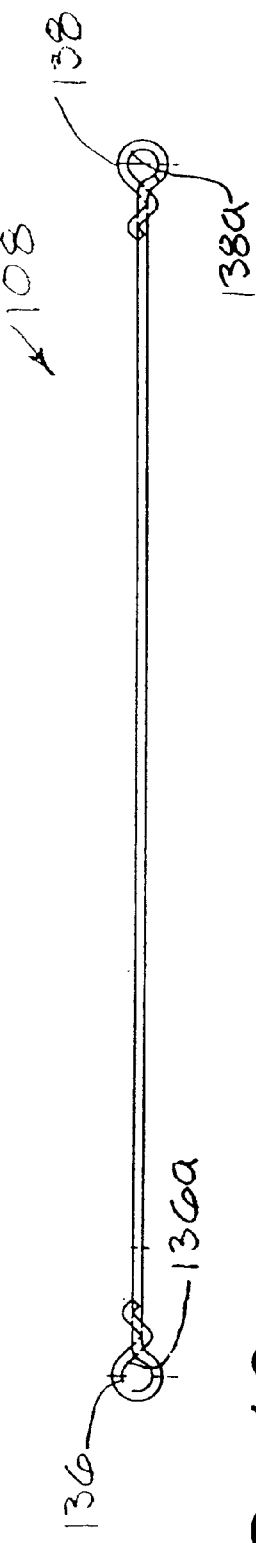
FIG. 10 is a side elevational view of a shaft thereof.

The lure 102 includes a noise-producing mechanism comprising a contact post 130 mounted on the aft section front end 107a and a contact comprising the front section back end 105b. FIGS. 4 and 5 show the contact post 130 extending forwardly from the aft section front end 107a for engaging the fore section back end 105b. The contact post 130 is preferably hollow with a passage 132 extending from a blind distal end 134 to the aft section interior 114. The passage 132 cooperates with the section interiors 114 and 124 to amplify the contact sound. For example, impacts on the contact post distal end 134 are transmitted through the passage 132 to the aft section interior 114. The impact sound is thus significantly amplified.

The shaft 108 includes front and back ends 136, 138 forming front and back eyes 136a, 138a respectively. The shaft 108 can comprise nickel titanium alloy wire (e.g. nitinol) with a memory characteristic. The shaft front end 136 protrudes from the fore section front end 105a and the shaft back end 138a is captured by the shaft pin 126a within the shaft boss 126.

The fore and/or aft section interiors 114, 124 can be loaded with metal balls 140 for additional noise, i.e. rattling caused by the motion of the lure 102. The lure 102 can be buoyancy positive or slightly negative, the latter condition providing a "suspended" operation with a sink rate of approximately six inches per minute.

V. Second Modified Embodiment: Fishing Lure 202.

Figure 11:
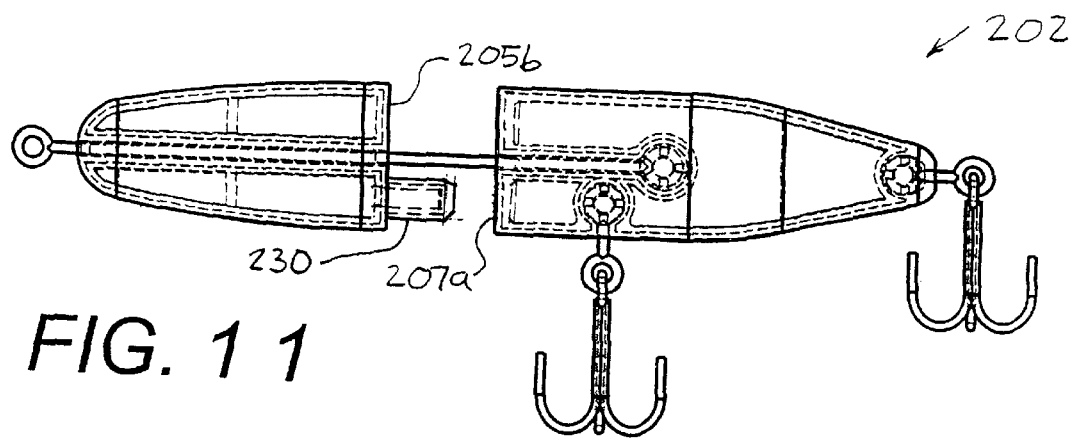
FIG. 11 is a side elevational view of a fishing lure comprising a second modified embodiment of the present invention.

Although the lures 1 and 102 have been described and depicted herein as having a striker 35 or contact post 130 which extends forwardly from the respective aft section front end 30, 107a and contacts the fore section rear end 18, 105b, as would be apparent to a person of ordinary skill in the art, the striker 35 or contact post 130 could just as easily extend rearwardly from the fore section rear end 18, 105b and contact the aft section front end 30, 107a. FIG. 11 shows a fishing lure 202 comprising a second modified embodiment of the present invention which is generally identical to the lure 102 but for having the contact post 230 mounted on the fore section back end 205b and engaging the aft section front end 207a.

VI. Third Modified Embodiment: Fishing Lure 302.

Figure 12:
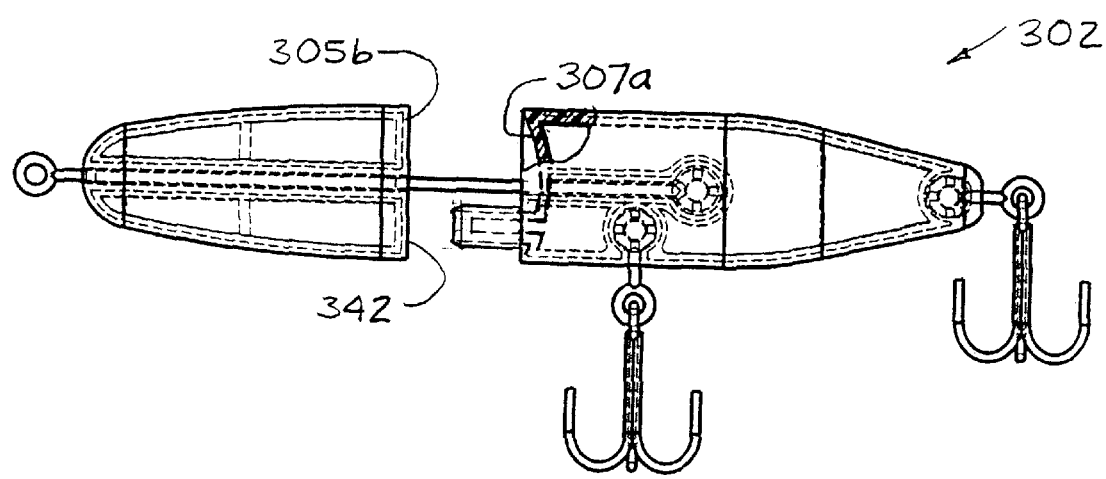
FIG. 12 is a side elevational view of a fishing lure comprising a third modified embodiment of the present invention, with a concave aft section front end.

FIG. 12 shows another modified embodiment of the present invention; fishing lure 302. The lure 302 is a modified version of the lure 102 which has a concave aft section front end 307a adapted for causing water to spurt outwardly from a clearance area 342 between the section ends 305b and 307a. The spurting quantity of water from between the sections adds another feature for attracting fish.

VII. Fourth Modified Embodiment: Fishing Lure 402.

Figure 13:
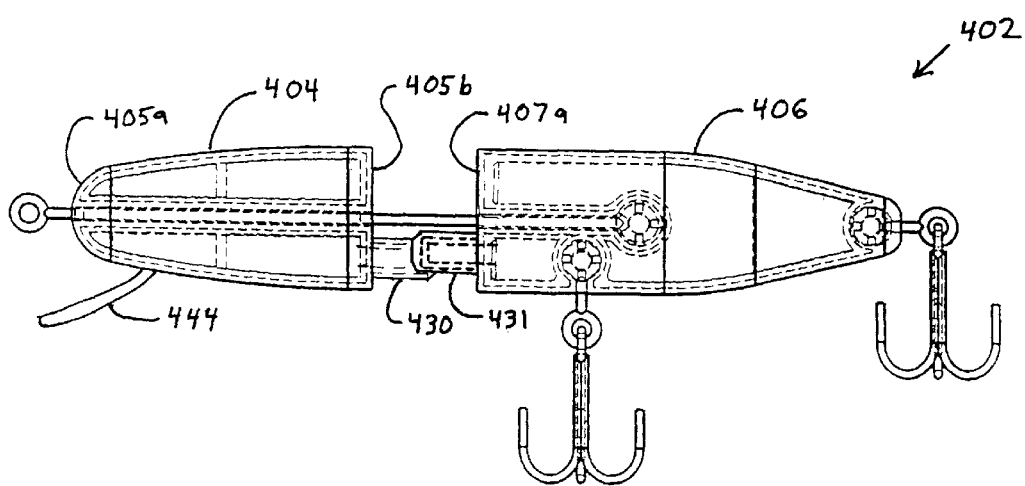
FIG. 13 is a side elevational view of a fishing lure comprising a fourth modified embodiment of the present invention.

FIG. 13 shows a fourth modified embodiment 402 of the present invention wherein the noise-making lure as previously and variously described is adapted for use as a diving crank bait. The lure 402 includes a bill or lip 444 which extends forwardly and downwardly from the fore section 404 proximate the front end 405a thereof and causes the lure 402 to dive as it is pulled through the water. The length of the bill 444 can be varied depending on the application in which the lure 402 is to be used. Generally, the longer the bill 444 used, the deeper the lure 402 will dive.

While the intended purpose of the bill 444 is to cause the lure 402 to dive, the force of the water acting on the bill 444 may tend to cause the fore section 404 of the lure 402 to spin as the lure 402 is pulled through the water instead of producing the intended diving effect. In order to stop the fore section 404 from spinning relative to the rear section 406, both sections 404, 406 of the lure 402 are equipped with respective posts 430, 431; the post 430 extending rearwardly from the fore section rear end 405b and the post 431 extending forwardly from the aft section front end 407a. In addition to producing the noise making effect as previously described, the posts 430, 431 engage each other as the fore section 404 attempts to spin, halting the relative rotation of the fore section 404. The bill 444 can incorporate a pitch angle which causes the fore section 404 to attempt to rotate in the proper clockwise or counter-clockwise direction for the posts 430, 431 to engage each other with the least possible relative rotational movement between the fore section 404 and the aft section 406.

VIII. Conclusion

It is to be understood that while certain forms of the present invention have been illustrated and described herein, it is not to be limited to the specific forms or arrangement of parts described and shown.

What is claimed and desired to be secured by Letters Patent is as follows:

1. A noise making fishing lure, which comprises:
   (a) a body having a longitudinal axis generally corresponding to a direction of travel of the fishing lure, said body including:
      (1) a fore section including fore section front and back ends, a fore section bore extending generally parallel to or coaxial with said axis between and open at said fore section front and back ends; and
      (2) an aft section including aft section front and back ends;
   (b) a shaft with a fore end and an aft end, said aft end fixedly mounted to said body aft section, said shaft extending generally parallel to or coaxial with said axis from said aft section front end;
   (c) said fore section slidably mounted on said shaft with said fore section bore longitudinally slidably receiving said shaft;
   (d) a first contact post fixedly attached to one of said aft section front end or said fore section back end, said first contact post being adjacent said shaft and oriented generally parallel to said shaft, said first contact post adapted to impact the other of said aft section front end or said fore section back end upon uneven motion of said lure through a body of water to create a sound;
   (e) said shaft fore end having a line attachment for attaching a line to said lure; and
   (f) a hook attachment for attaching a hook to said body.

2. The fishing lure as in claim 1, wherein said aft section is less buoyant than said fore section.

3. The fishing lure as in claim 1, wherein said other of said aft section front end or said fore section back end includes a contact comprising a contact disc with an outer contact surface, and said first contact post comprises a striker with a shaft and a head for impacting said outer contact surface.

4. The fishing lure as in claim 3, wherein the one of said fore section or said aft section which includes said contact disc further includes a ballast member for aligning said disc with said striker.

5. The fishing lure as in claim 1, wherein the one of said fore section or said aft section to which said first contact post is attached has a hollow interior.

6. The fishing lure as in claim 5, wherein said first contact post is hollow with a contact post bore communicating with said one section interior.

7. The fishing lure as in claim 5, wherein the other of said fore section or said aft section also has a hollow interior.

8. The fishing lure as in claim 7, wherein one of said fore or aft section hollow interiors includes a metal ball which rattles within said one hollow interior with motion of said lure, creating noise.

9. The fishing lure as in claim 5, wherein each of said fore and aft sections is formed in two halves joined together along a longitudinal seam.

10. The fishing lure as in claim 9, wherein said shaft aft end includes an eye, said eye being captured by a shaft boss and shaft pin formed in said aft section halves along said longitudinal seam.

11. The fishing lure as in claim 1, wherein said shaft extends through said aft section from said aft section front end to said aft section back end and said shaft aft end includes a hook attachment for attaching a hook to said lure.

12. The fishing lure as in claim 1, wherein said shaft is nickel titanium alloy wire with a memory characteristic.

13. The fishing lure as in claim 1, wherein said aft section front end is concave.

14. The fishing lure as in claim 1, and further including a bill extending forwardly and downwardly from said fore section proximate said fore section front end, said bill for causing said lure to dive as said lure is pulled through a body of water.

15. The fishing lure as in claim 14, wherein said other of said aft section front end or said fore section back end includes a second contact post, said second contact post for impacting said one of said aft section front end or said fore section back end to create a sound and for engaging said first contact post to prevent said fore section from spinning relative to said aft section.

16. The fishing lure as in claim 15, wherein said bill has a pitch angle causing said fore section to rotate in the direction which produces the least relative rotational movement between said fore section and said aft section before said second contact engages said first contact post.

17. A noise making fishing lure, which comprises:
  (a) a body having a longitudinal axis generally corresponding to a direction of travel of the fishing lure, said body including:
    (1) a fore section including fore section front and back ends, a fore section bore extending generally parallel to or coaxial with said axis between and open at said fore section front and back ends; and
    (2) an aft section including aft section front and back ends;
  (b) a shaft with a fore end and an aft end, said aft end fixedly mounted to said body aft section, said shaft extending generally parallel to or coaxial with said axis from said aft section front end;
  (c) said fore section slidably mounted on said shaft with said fore section bore longitudinally slidably receiving said shaft;
  (d) a bill connected to said fore section proximate said fore section front end and extending forwardly and downwardly from said fore section, said bill for causing said lure to dive as said lure is pulled through a body of water;
  (e) a first contact post fixedly attached to said aft section front end, said first contact post for impacting said fore section back end to create a sound;
  (f) a second contact post fixedly attached to said fore section back end, said second contact post for impacting said aft section front end to create a sound and for engaging said first contact post to prevent said fore section from rotating about said shaft relative to said aft section,
  (g) said shaft fore end having a line attachment for attaching a line to said lure;
  and
  (h) a hook attachment for attaching a hook to said body.

18. The fishing lure as in claim 17, wherein said bill has a pitch angle causing said fore section to rotate in the direction which produces the least relative rotational movement between said fore section and said aft section before said second contact post engages said second contact post.

19. The fishing lure as in claim 17, wherein:
  (a) one of said fore or aft sections is hollow with a respective section interior; and
  (b) the one of said first or second contact posts mounted on said on e section is hollow with a contact post bore communicating with said one section interior.

20. The fishing lure as in claim 17, wherein said aft section front end is concave.

* * * * *